Sept. 4, 1956 F. O. BLACK, JR 2,761,730
VEHICLE DUMP BODIES
Filed Jan. 2, 1953 2 Sheets-Sheet 1
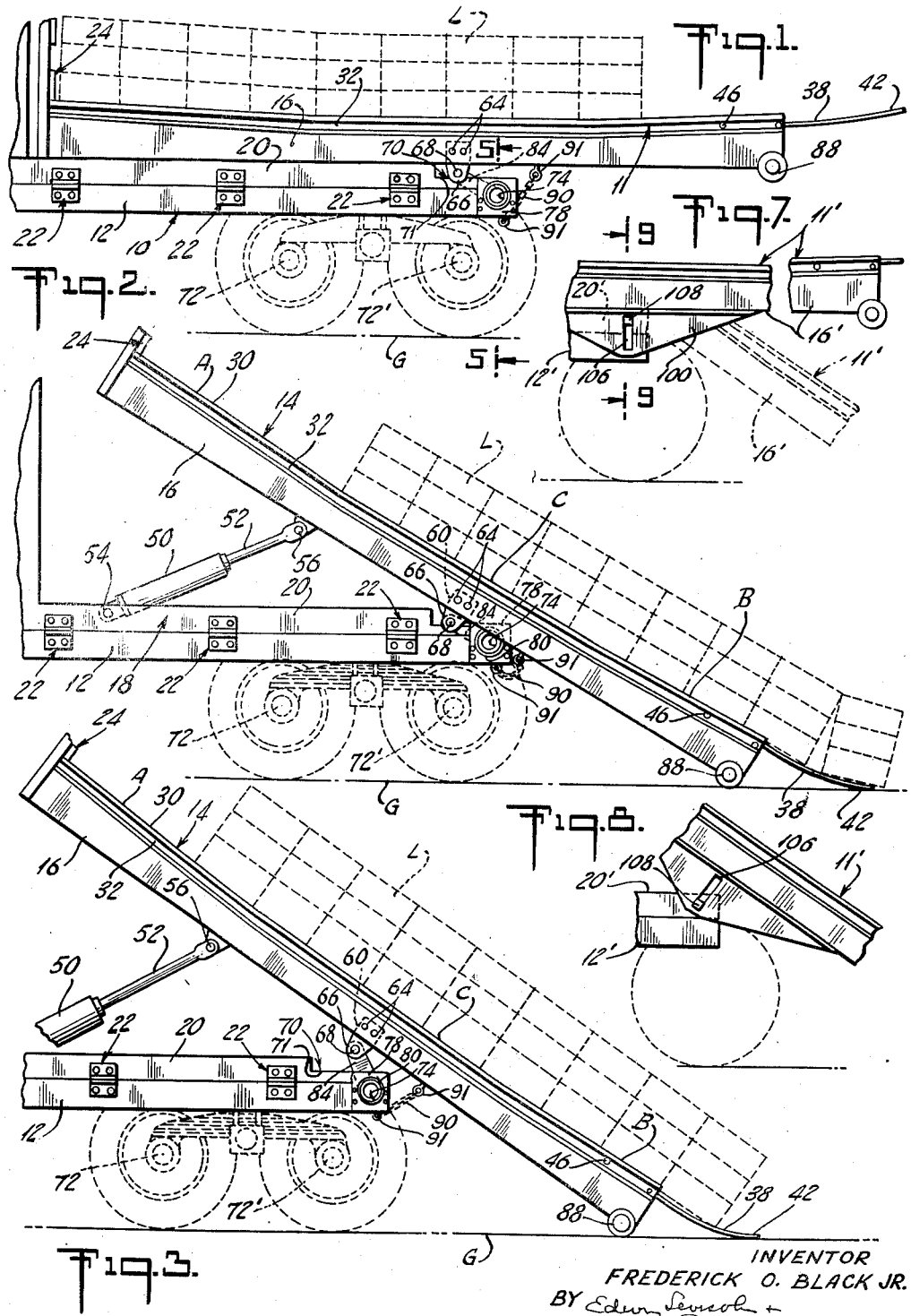
INVENTOR
FREDERICK O. BLACK JR.
BY
ATTORNEYS

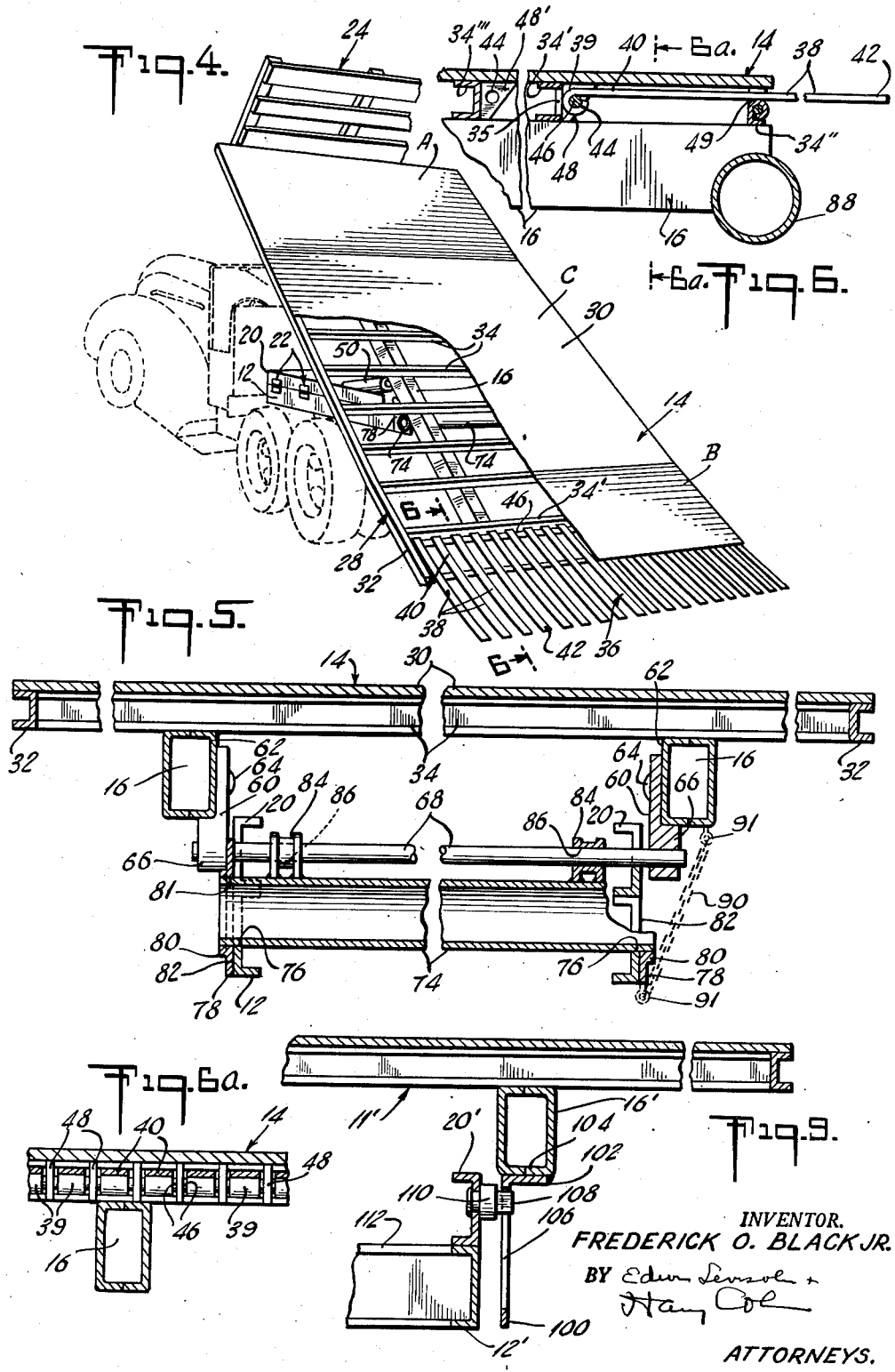

United States Patent Office 2,761,730
Patented Sept. 4, 1956

2,761,730

VEHICLE DUMP BODIES

Frederick O. Black, Jr., Jersey City, N. J.

Application January 2, 1953, Serial No. 329,260

9 Claims. (Cl. 298—19)

This invention relates generally to improvements in vehicle bodies and, more particularly, to improvements in vehicle bodies of the dump-type.

In conventional dump-type vehicle bodies, wherein it is desirable or necessary to provide the smoothest possible continuity of the body with the ground when unloading frangible material, such bodies are mounted on the vehicle for pivotal movement about a fixed pivotal axis and the pivotal movement of such body and the tipping angle thereof is limited to a certain maximum which is the position of the body when a rear portion thereof strikes the ground. With such conventional bodies when the vehicle is dumping a load on an area which is inclined upward from the rear of the vehicle, for example, a rear portion of the body may strike the ground, on the tilting of such body, before the desired tipping angle is reached in which case difficulty in discharging the load is encountered.

It is accordingly one of the important objects of the present invention to provide a dump-type vehicle body which eliminates the disadvantages inherent in a conventional dump body of the above type. Pursuant to this object of the present invention the dump-type vehicle body is so constructed and arranged as to have all of the desirable basic features of a conventional dump body unit and is additionally provided with means whereby the body unit may be moved to a greater tilting angle than was possible with conventional bodies of the above mentioned type.

It is another important object of the present invention to provide a dump-type vehicle body in which the platform thereof is so constructed and arranged that the load disposed thereon may be unloaded gently without subjecting such load to any appreciable amount of impact or shock whereby such body is eminently suitable for the transporting and unloading of commodities which are inherently frangible such as cinder block, cement block, and the like, although it is to be understood that such dump body is not necessarily limited to such applications.

It is another object of the present invention to provide a dump-type vehicle body of the above character which is of simple and relatively economical construction and which may be installed on a conventional vehicle chassis without substantial modification thereof.

It is another object of the present invention to provide a dump-type vehicle body of the above character in which such body is provided with rear end structure which is adapted to flex when the body is inclined to dumping position whereby commodities on being unloaded from the body will be eased on the ground to avoid the breakage and damaging of frangible commodities.

It is another object of the present invention to provide a dump-type vehicle body of the above character which is adapted to discharge its load in less time than required in heretofore used methods of unloading frangible materials by hand, or other mechanical means, especially under adverse terrain conditions, without damage to the load.

Yet another object of the present invention is the provision of a generally improved dump-type vehicle body of the above character which is simple in design, of greatly reduced weight, fool-proof in operation, and highly efficient in the accomplishment of its intended purposes.

The above and other objects, features and advantages of the present invention will be more fully understood from the following description considered in connection with the accompanying illustrative drawings.

In the drawings:

Fig. 1 is a fragmentary side elevational view of a truck having a dump body mounted thereon formed according to the present invention;

Fig. 2 is a view similar to Fig. 1 showing the dump body in an inclined position;

Fig. 3 is a view similar to Fig. 2 showing the dump body in a further inclined position;

Fig. 4 is a perspective view showing the dump body in an inclined position with parts broken away to reveal structural details;

Fig. 5 is a sectional view taken on the line 5—5 of Fig. 1;

Fig. 6 is a sectional view taken on the line 6—6 of Fig. 4;

Fig. 6A is a sectional view taken on the line 6A—6A of Fig. 6;

Fig. 7 is a fragmentary side elevational view of a modified form of dump body;

Fig. 8 is a view similar to Fig. 7 showing the dump body in an inclined position; and Fig. 9 is a sectional view, on an enlarged scale, taken on the line 9—9 of Fig. 7.

Referring to the drawings and more particularly to Figs. 1 through 3 thereof, there is shown a vehicle chassis 10 of any conventional design having a dump-type body 11 tiltedly mounted thereon. The chassis 10 is conventional in all respects and is unmodified except as will be pointed out in detail hereinafter and, as is conventional in such chassis, the latter is provided with a pair of spaced longitudinally extending channel membens 12 which ane adapted for the support of the body 11 mounted thereon. Although in the illustrated embodiment a six wheel tandem axle type truck is illustrated it will be understood that the body 11 may be suitably mounted on any conventional truck chassis 10. The dump-type body 11 comprises a platform 14 which is suitably mounted on a pair of laterally spaced longitudinally extending stringers 16, the latter being mounted relative to the sub-frame 18 in a manner to be described hereinafter. The sub-frame 18 comprises a pair of longitudinally extending support members 20 which are laterally spaced corresponding to the spacing of the channel members 12 of chassis 10. The members 20 of the dump body sub-frame are structurally interconnected in any conventional manner and are secured on the members 12 of chassis 10 through the intermediation of a plurality of angle brackets 22. The body 11 may be of any desired type and in the illustrated embodiment such body is provided with forward end structure 24 of conventional design. It is to be understood that the members 12 and 20 may be secured together in any conventional manner and the manner herein specifically shown and described is by way of illustration only. The platform 14 comprises a frame structure 28 having a floor or cargo supporting plate 30 suitably affixed thereto, said frame 28 comprising a pair of laterally spaced longitudinally extending frame members 32 which are secured together by means of the cross members 34. Thus the cargo supporting floor 30 which may be constituted by a plurality of separate plates is adapted to be suitably affixed to the platform frame 28 in any desired manner, as by means of welding and the like, and said floor 30 is adapted to have cargo load L disposed thereon. The longitudinally extending members 32 and cross members 34 are preferably in the form of channel members, as best shown in Figs. 5 and 6, and said channel members when secured together in the manner aforedescribed constitute the supporting structure for floor or cargo supporting surface 30.

With reference to Figs. 5 and 6, it will be noted that the rear end portion of platform 14 is constituted by the spring means 36, the latter comprising a plurality of spaced leaf springs 38 having their ends 40 secured to the platform 14 in a manner which will be described in detail hereinafter, the opposite ends 42 thereof being free. The end 40 of each of the leaf springs 38 has a portion thereof which is bent back upon itself to form a fitting 39 having a transverse aperture 44 which is adapted for the reception of the transverse rod 46 which constitutes the mounting means for said springs. Each of the springs 38 are mounted in an identical manner to the platform 14 and accordingly the mounting of one of such springs only will be described in detail. One of the cross members 34′ at a rear end portion of the platform 14 has suitably secured thereto a plurality of bearing parts 48, the latter being apertured for the reception and consequently the support of the transverse rod 46 which is utilized for the pivotal mounting of springs 38. It will be understood that the transverse rod 46 extends between the longitudinal channel members 32 and that the latter are suitably transversely apertured for the reception of said rod. The rearmost cross member 34″ of the platform 14 is slotted at spaced intervals as indicated at 49 for the reception therethrough of the spring members 38, it being understood that said spring members are pivotally mounted on the transverse rod 46 and are supported intermediate their ends by means of the cross member 34″ which, as pointed out above, is suitably slotted at 49 for the reception therethrough of said spring members and for holding the latter in laterally spaced relation. The free ends 42 of the spring members 38 are adapted to be flexed in a manner which will be described in detail hereinafter when the platform 14 is tilted to a position in which said spring members engage the ground.

Any suitable means may be provided for raising the platform 14 from its substantially horizontal or normal retracted position, as shown in Fig. 1, to incline positions as illustrated in Figs. 2 and 3. In the illustrated embodiment the means for raising platform 14 is constituted by a hydraulic cylinder 50 having a piston rod 52 adapted to telescope outwardly of cylinder 50 for raising the platform 14 as will be readily understood. One end 54 of hydraulic cylinder 50 is pivotally mounted to the subframe 18 in any desired manner and the end 56 of the piston rod 52 is suitably pivotally secured to the platform 14 in any conventional manner. Thus the piston rod 52 is adapted to telescope outwardly of its companion cylinder 50 for raising the platform 14, it being understood that said platform may be raised to any desired inclination within a range to be described in detail hereinafter, said angle of inclination being controllable by the amount of extension of the piston 52 outwardly of its cylinder 50 which is under the control of the operator. The mounting of the platform 14 to the vehicle chassis 10 will now be described in detail.

Suitably secured to a rear portion of the longitudinal frame member 16 of platform 14 are a pair of bearing brackets 60, the latter being secured to the inner face 62 of members 16 in any desired manner, as by means of bolts 64. The bearing brackets 60 are apertured therethrough at their lower end portions, as indicated at 66, said bearing brackets being in transverse alignment and adapted for the support of the transverse rod 68. Thus the bearing brackets 60 constitute the bearing support means for end portions of the transverse rod 68 and the latter constitutes the normal pivot axis for the platform 14. The longitudinal member 20 are cutaway at a rear portion as indicated at 70 and said cut-away portion is adapted to receive a portion of the transverse rod 68 when the latter is in its lowermost position. The horizontal edges 71 of cutaway portions 70 of the frame members 20 constitutes stop means for the transverse rod 68 when the latter is in its normal position, as shown in Figs. 1 and 2. It will be noted that the transverse rod 68 which constitutes the normal pivotal axis for the platform 14 is in substantial vertical alignment with the rear axle 72′ of the tandem axles 72. The transverse rod 68 is preferably positioned in the region of vertical alignment with the rear axle 72′ of tandem axles 72 for the attainment of optimum weight and balance characteristics although it is to be understood that the particular location herein preferred is not critical and that transverse rod 68 may be positioned otherwise than as specifically shown and described herein. In conventional dump-type vehicle bodies the transverse rod 68 constitutes a fixed pivotal axis for the pivotal movement of such body and in such an arrangement the tipping angle thereof will be limited to a maximum which is the position of the body 14 when a rear end portion thereof strikes the ground G. Thus if the transverse rod 68 were positioned in a fixed position and restrained against bodily movement the maximum tipping angle of platform 14 would be the angle of inclination illustrated in Fig. 2. Thus with the transverse rod 68 fixed against bodily movement the tipping angle of platform 14 will be limited to the position shown in Fig. 2, which is the maximum attainable angle of inclination and is limited by the engagement of the rear end of the platform with the ground G. In accordance with the present invention means are provided whereby platform 14 may be moved to a greater tilting angle than the angle attained as shown in Fig. 2 when the rear portion of the body strikes the ground. Such a greater tilting angle is achieved by mounting the main pivotal axis, here constituted by transverse bar 68, for bodily movement from the position shown in Figs. 1 and 2 to a position displaced from said first mentioned position, for example, to the position shown in Fig. 3.

Extending between the longitudinal members 12 at the rear part of chassis 10 is a torsion tube 74 which has its ends portions extending past the cut-away portions 76 of members 12, the latter having secured thereto bearing plates 78 which carry annular bearing portions 80. Thus the bearing plates 78 are suitably affixed to the outer faces 82 of members 12 and said plates are adapted for mounting the torsion tube 74 for rotation. It will be understood that the members 12 are suitably cut-away at their rear end portions 76 to provide clearance for adjacent portions of the torsion tube 74. Plates 78 are apertured therethrough as indicated at 81 for the reception of tube 74 and apertures 81 together with portions 80 form bearings for the pivotal mounting of said tube. The torsion tube 74, which is preferably spaced rearwardly of the transverse rod 68, is rigidly secured to said transverse rod through the intermediation of a pair of arms or links 84. Thus the torsion tube 74 and the pair of links 84 constitutes the means for pivotally mounting the transverse bar 68 for pivotal movement from its lowermost position shown in Figs. 1 and 2 to its fully extended or raised position shown in Fig. 3. The links 84 are suitably apertured therethrough as indicated at 86 for the reception therethrough of the transverse bar 68, said transverse bar being thereby structurally connected to the torsion tube 74 through the intermediation of the links 84. The links 84 are secured to a peripheral portion of the torsion tube 74 in any desired manner, as by means of welding and the like, and if desired the transverse bar 68 may be mounted for rotation relative to said links although it is to be understood that said rotational mounting is not necessary. Mounted to members 16 of the platform 14, rearwardly thereof, is a roller 88, said roller being transversely mounted and adapted to facilitate the movement of the rear end of the members 16 when the latter are in engagement with the ground. When it is desired to discharge the load L the platform 14 is raised from its normally horizontal position shown in Fig. 1 to an inclined or tilted position, one of such positions being illustrated in Fig. 2. On the extension of the piston rod 52 outwardly of the cylinder 50 the platform 14 is pivoted about the pivotal axis constituted by the transverse rod 68 and the tilting movement of said platform is limited by the engagement of roller 88 with the ground G with the transverse bar 68 constituting the pivotal axis for said platform. If the angle of inclination of the platform 14 is insufficient to overcome the friction between the load and floor 30 to discharge the load L from the floor the continued extension of the piston rod 52 outwardly of cylinder 50 will result in the bodily movement of the transverse bar 68 upwardly from its position shown in Fig. 1 and 2 to a position of greater inclination as illustrated in Fig. 3. Thus the continued raising of platform 14 after the rear end thereof strikes the ground will result in the increase of the angle of inclination of the platform, the latter on such further inclination pivoting about the ground and roller 88 with the torsion tube 74 correspondingly being rotated about the axis thereof. From the above it will be apparent that oncee roller 88 of the platform strikes the ground the continued raising of said platform will result in the increase of the angle of inclination thereof, said platform pivoting about the axis of roller 88. When a truck is unloading uphill, for example, the rear end of the platform may be in engagement with the ground prior to the time when load L starts to slide off the floor 30 and in such case it is merely necessary to continue the further raising of the platform which will result in the bodily displacement of the transverse rod 68 upwardly from its normal position and said platform will be pivoted to a position of greater inclination about a pivotal axis constituted by the axis of roller 88. Accordingly the platform will pivot about the transverse bar 68 until a maximum angle of inclination is reached which will be the position of engagement of the rear end of the platform with the ground and the further pivotal movement of said platform will result in the increase of the angle of inclination thereof in the manner specifically described above. When the platform 14 is pivoted from the position shown in Fig. 2 to the position shown in Fig. 3, the roller 88 which is in engagement with the ground will constitute the pivot axis for the platform with arms 84 pivoting about the axis of rotation of the tube 74 whereby it will be apparent that the roller 88 will be longitudinally displaced as the platform is pivoted from the position illustrated in Fig. 2, the latter position being the maximum angle of inclination attainable in the illustrated embodiment.

On the engagement of the roller 88 with the ground the free ends 42 of the spring members 38 are adapted to flex upwardly whereby to provide for the unloading of cargo L from floor 30 in a substantially parallel disposition with the ground. Thus the flexure of the spring members 38 in the manner illustrated in Figs. 2 and 3 provides for the unloading of cargo L by easing the latter on the ground whereby to prevent the damage or the breaking of cargo L being unloaded from the cargo supporting floor 30. Thus when the platform roller 88 is in engagement with the ground the free ends 42 of the spring members 38 will flex an appreciable amount to tend to direct load L on the ground in a substantially parallel disposition with the latter. If desired, the spring members 38 may be arranged for retraction inwardly of the platform 14 so as to shorten the overall length of the truck which may be desired when the truck is driven over the highway. It will be understood that if desired any suitable means may be provided to effect the retraction of the spring members 38 inwardly of the rear end of the body. As here shown with reference to Figs. 6 and 6A, the cross member 34' is slotted at spaced intervals as indicated at 35, said slots being spaced corresponding to the spacing of springs 38. The cross member 34''', spaced forwardly of cross member 34', is provided with a series of bearing parts 48' which are structurally similar to bearing parts 48 and similarly spaced, it being noted that members 32 are suitably apertured therethrough in alignment with the apertures of bearing parts 48' for the reception of rod 46 when springs 38 are secured in their retracted position. Thus for the retraction of springs 38, rod 46 will be disconected from the body by withdrawing the same from bearing parts 48 and members 32 and reinserting such rod through bearing parts 48' and apertures 44 of said springs after the retraction of the latter through slots 35. It will be understood that said spring members are adapted to deflect within substantial limits so that they may accommodate themselves to the terrain conditions encountered.

Extending between a rear portion of the longitudinal members 16 and a rear portion of the members 12 are a pair of lengths of chain designated by the numerals 90, said lengths of chain being secured to said members by means of fittings 91 and are adapted for a purpose which will now be described. The lengths of chain 90, each of which comprises a plurality of interconnected links, act as a counter-force or restraining force to prevent the dump body from floating. It will be understood that when the load L is disposed in transporting disposition as shown in Fig. 1 and if such load is disposed too far forwardly of the platform there is danger of the body floating and to positively prevent such floating movement of the body the lengths of chain 90 are provided. Thus chains 90 will prevent the rear end of the body from floating or raising from chassis 10 when the body is in normal horizontal or transporting position and furthermore such chains act to limit the maximum angle of inclination of platform 14, so as to prevent the over-centering of the bar 68, i. e. movement of links 84 clockwise viewing Fig. 3, so that they lie beyond an angle of 90° with respect to members 16. Chains 90 are adapted to be somewhat tensioned when the body is in travelling position and furthermore such chains will become tensioned, as shown in Fig. 3, when the maximum permissible angle of inclination of said body is reached with the rear end of the body against the ground. It will be apparent that if such chains were not provided there would be a danger of over-centering of the bar 68 whereby to prevent the lowering of the body in the normal manner. From the above it will be apparent that chains 90 act as a counter force to prevent the body from floating when in travelling position and such chains also constitute means to limit the maximum angle of inclination attainable by the platform when the rear end thereof contacts the ground. It will be understood that load L will have its center of gravity normally positioned forwardly of the transverse bar 68 whereby the latter will constitute the pivot axis for the platform during the raising of such load from its retracted or lowered position to the angle of inclination illustrated in Fig. 2, which is the maximum angle of inclination attainable with the transverse bar 68 acting as the pivot axis for the body.

With reference to Figs. 1 through 3, it will be noted that the forward and rearward portions of the cargo floor 30, A and B, respectively, are inclined upwardly relative to the median portion C of said floor, preferably surface portions A, C and B are curved rather than flat so that they merge smoothly with each other, forming a front to rear continuously curved load supporting surface. On the unloading of cargo L, as the body is tilted the portion A of the supporting floor 30 is adapted to initiate an unloading force on cargo L and as the load moves rearwardly the portion B at the rear part of the truck is adapted to resist the force initiated by the inclined portion A and retards the speed of descent of the load. Thus the forward part of the load positioned above section A of floor 30 exerts an unloading force on the rear part of the load positioned above the sections B and C, this arrangement resulting in the initial rearward movement of the load when the body is tilted. This floor arrangement also affords to the truck operator some degree of control in unloading his truck. As is conventional in the truck unloading operation the truck is adapted to be moved forwardly to complete the unloading thereof. From the above it will be seen that when the body is raised to an unloading position the inclined portion A will exert an unloading force on said cargo and the inclined portion B will tend to counter-act such unloading force whereby the effect will be to ease load L onto the ground. Furthermore in this regard it is to be noted that the platform end structure constituted by the spring members 38 also tends to decelerate the speed of descent of load L so that said platform inclination and said end structure will have the cumulative effect of depositing load L on the ground wtihout any impact or shock. In general, the upward inclination of body part B is somewhat greater than the upward inclination of the forward part A. While the angular relation of surfaces A, B and C may vary within wide limits and while the top load-supporting surface of the body may even be of flat planar form, I have found that good results are obtained when the forward end of surface A is at an angle of about 5° with respect to the longitudinal axis of member 16 and the rear end of surface B is at an angle of about 15° with respect to said longitudinal axis. In this connection, it will be understood, however, that the specific and relative inclinations of said surfaces will vary according to the character of the material of the load.

From the above it will be apparent that the dump truck body 11 aforedescribed is adapted to unload cargo L gently without subjecting such load to any substantial amount of impact or shock whereby the body is eminently suitable for the transporting and unloading of commodities which are inherently frangible such as cinder block, cement block, and the like, although it is to be understood that the dump body aforedescribed is not necessarily limited to such applications.

As aforenoted body 11 is provided with a torsion bar 74 which connects the links 84 together, it being noted that said torsion bar is effective to prevent independent movement of the links 84 and also to counteract any twisting tendency of the body. Thus if on the raising of the body one side end portion thereof is obstructed a twisting moment will be imparted to the body wherefore it will be evident that the torsion bar 74 will be effective to counteract any such twisting tendency by coupling the links 84 against independent action. Furthermore the torsion tube 74 will be effective to counteract any twisting tendency of the body if one side thereof hits the ground before the other side. It is desirable to select a platform plate 30 having an abrasion resisting surface and to provide for a comparatively low coefficient of friction between load L and such platform surface. In a case where a short body is mounted on the chassis 10 it will be desirable to provide a double acting type of hydraulic cylinder which will be effective to overcome the weight disposed rearwardly of the truck. Thus in a situation where a short body is used it is possible that a single acting hydraulic cylinder will be ineffective for the lowering thereof and to overcome weight disposed toward the rear of the truck in such a case it will prove desirable to utilize a double acting cylinder.

The body is so designed that the roller 88 touches the ground just before the load slides off the floor 30 with the truck positioned on substantially level ground, it being noted that this particular design arrangement is preferable, but not necessary.

With reference to Figs. 7, 8 and 9, there is shown a modified form of body mounting arrangement in which the main pivotal axis of the body is mounted for bodily displacement or floating movement in a modified manner. A rear end portion of each of the longitudinal frame members 16' has a triangular plate 100 secured thereto, and more particularly, said plate has a depending flange portion 102 which is secured to the lower face 104 of each of the members 16'. Each of the plates 100 is provided with a slot 106 which is adapted for the reception of a companion stub shaft 108, the latter being secured to an adjacent member 20' in any desired manner. The stub shafts 108 are preferably of quadrilateral cross section and are formed complementary to the slots 106. The stub shafts 108 are fixed to the members 20' and constitute and end portion of the fittings 110 which are secured to a face portion of said members 20', and the plates 100 are adapted to ride up their companion stub shafts 108 when the truck body is pivoted to an inclination greater than the inclination at which the rear portion of the body strikes the ground. Thus as shown in Fig. 7, the stub shafts 108 are adapted to be positioned uppermost in slot 106 of plate 100 when the body is both in travelling position and is inclined to a maximum angle of inclination in which the rear portion of the truck body engages the ground. After a rear portion of the body engages the ground, the further raising of the truck body in the manner aforedescribed will result in plates 100 riding up shafts 108 up to a position of maximum inclination which is the position shown in Fig. 8. Thus the position of maximum inclination will be the position at which the shafts 108 are in cooperative engagement with the bottom of the slots 106 of plates 100. Thus the modified form of body 11' as shown in Figs. 7, 8 and 9 functions in a similar manner to body 11, it being noted that the normal pivotal axis is constituted by the shafts 108 positioned uppermost in slots 106 and that plates 100 are adapted to ride up said shafts after an angle of inclination of the body is reached in which a rear portion thereof is in engagement with the ground. The members 12' are interconnected at a rear end portion by cross member 112 to rigidify the rear end portion of the truck. It will be evident that in the modification of Figs. 7 through 9, when the body is inclined to a position in which a rear end portion thereof is in engagement with the ground and such body is further raised the pivotal point for such body will be the ground, and, more particularly, the point of engagement between such rear end portion of the truck and the ground. Thus the pivotal axis of the truck body will be shifted from the shafts 108 to the ground when the body is inclined further from a position in which the rear end portion thereof is in engagement with the ground. It is to be understood that the term ground as herein used refers to any surface on which load L is to be deposited and is intended therefore to have the generic connotation of a cargo receiving surface.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. In a truck having a chassis and a body tiltably mounted thereon, the combination with said chassis and body of means for supporting the body for tilting movement relative to said chassis, means providing for movement of the body to an inclined position relative to said chassis at a maximum angle of inclination normally limited by the engagement of the rear part of the body with the ground, and means providing for the displacement of said first mentioned means relative to said chassis whereby to provide for the movement of the body to an inclined position at an angle of inclination greater than said maximum angle when the rear part of the body is in engagement with the ground.

2. A dump-type body adapted for mounting on a vehicle chassis, comprising a platform which is pivotally movable between retracted and raised positions, means for moving said platform relative to said chassis between said retracted and raised positions about a pivotal axis, means for pivotally mounting said platform for the pivotal movement thereof, and means providing for said shifting of the pivotal axis from said pivotal mounting means to positions displaced therefrom and displaced from said chassis when said platform is moved to a position in which a rear part thereof is in engagement with the ground with said body being displaced relative to said chassis at said mounting means.

3. A dump-type body adapted for mounting on a vehicle chassis, comprising a platform which is pivotally movable between retracted and raised positions, means for pivotally moving said platform between said retracted and raised positions, means for pivotally mounting said platform for the pivotal movement thereof, said pivot means comprising a pivot rod extending transversely of said platform, means for pivotally mounting said pivot rod for bodily movement between a retracted position and positions displaced upwardly therefrom, said last mentioned pivot means comprising a transversely extending torsion resisting member positioned rearwardly of said pivot rod, and means for rigidly linking said torsion resisting member and said pivot rod.

4. In a truck having a chassis and a body tiltably mounted thereon, the combination with said chassis and body of first pivot means for the movement of said body from a lowered position to a maximum inclined position in which the ground at the rear part of the body prevents further tilting of the body about said first pivot means in the same direction, and means for moving said body to a greater inclination while the rear part thereof is in engagement with the ground, said means comprising a torsion tube pivotally mounted to said chassis in fixed relation therewith rearwardly of said first pivot means, and means for rigidly linking said first pivot means to said torsion tube, said first pivot means being in fixed relation to said body whereby the movement of said body to said greater inclination causes said first pivot means to bodily move upwardly from said chassis.

5. In a truck having a chassis and a body tiltably mounted thereon, the combination with said chassis and body of first pivot means for the movement of said body from a lowered position to a maximum inclined position in which the ground at the rear part of the body prevents further tilting of the body about said first pivot means in the same direction, and means for moving said body to a greater inclination while the rear part thereof is in engagement with the ground, said means comprising a torsion tube pivotally mounted to said chassis in fixed relation therewith rearwardly of said first pivot means, and means for rigidly linking said first pivot means to said torsion tube, said first pivot means being in fixed relation to said body whereby the movement of said body to said greater inclination causes said first pivot means to bodily move upwardly from said chassis, and means extending between said chassis and body for preventing the displacement of said first pivot means when said body is in said lowered position, said last mentioned means being effective to limit the upward movement of said first pivot means when said body is moved to said greater inclination.

6. In a truck having a chassis and a body tiltably mounted thereon, the combination with said chassis and body of first pivot means for the movement of said body from a lowered position to a maximum inclined position in which the ground at the rear part of the body prevents further tilting of the body about said first pivot means in the same direction, and means for moving said body to a greater inclination while the rear part thereof is in engagement with the ground, said means comprising a member in fixed relation relative to said body, said member being slotted for the reception of said first pivot means, the latter being in fixed relation relative to said chassis.

7. A hoist comprising structure mounted for tilting movement to positions at different angles of inclination, means for supporting said structure for said tilting movement about one pivot, means for moving said structure to said positions at different angles of inclination, and means mounting said pivot for movement of the latter to an elevated position for increasing the angle of inclination of said structure, said last mentioned means comprising a transversely extending torsion resisting member positioned rearwardly of said one pivot, and means for rigidly linking said torsion resisting member to said one pivot.

8. A dump-type body adapted for mounting on a truck chassis, comprising a platform mounted for tilting movement to positions at different angles of inclination, said platform having a load supporting surface terminating at the rear thereof with flexible and resilient means, the latter being adapted to upwardly flex on the engagement thereof with the ground when said platform is tilted for the discharge of said load, said flexible and resilient means comprising a plurality of laterally spaced longitudinally extending spring members having free ends, means providing for the retraction of said spring members inwardly of said platform, and means for tilting said platform to said different angles of inclination.

9. A dump-type body adapted for mounting on a vehicle chassis, comprising a platform which is pivotally movable between retracted and raised positions, means for moving said platform relative to said chassis between said retracted and raised positions about a pivotal axis, pivot means for pivotally mounting said platform for the pivotal movement thereof to a normal maximum angle of inclination, means preventing rearward movement of said pivot means during the movement of said platform to said normal angle of inclination and means providing for the shifting of said pivotal axis from said pivotal mounting means when said platform is moved to an inclined position at an angle of inclination greater than said maximum angle with said platform being displaced relative to said chassis at said pivotal axis.

References Cited in the file of this patent

UNITED STATES PATENTS

| | | |
|---|---|---|
| 561,398 | Hill | June 2, 1896 |
| 691,330 | Watson | Jan. 14, 1902 |
| 831,472 | Richardson | Sept. 18, 1906 |
| 1,185,338 | Mecking | May 30, 1916 |
| 1,248,024 | Shadbolt | Nov. 27, 1917 |
| 1,442,769 | Jackson et al. | Jan. 16, 1923 |
| 1,621,075 | Larkin | Mar. 15, 1927 |
| 1,858,797 | Wood et al. | May 17, 1932 |
| 2,037,999 | Ochsner | Apr. 21, 1936 |
| 2,152,644 | Hiser | Apr. 4, 1939 |
| 2,190,869 | Frentzel et al. | Feb. 20, 1940 |
| 2,482,608 | Bedell | Sept. 20, 1949 |
| 2,703,658 | Bazzell | Mar. 8, 1955 |

FOREIGN PATENTS

| | | |
|---|---|---|
| 834,003 | France | Aug. 1, 1938 |